United States Patent
Dian et al.

(10) Patent No.: US 7,735,360 B2
(45) Date of Patent: Jun. 15, 2010

(54) METHOD FOR DETERMINING THE REVERSAL OF DIRECTION OF ROTATION OF AN ENGINE

(75) Inventors: Vincent Dian, Regensburg (DE); Valérie Gouzenne, Toulouse (FR); Pierre Zouboff, Toulouser (FR)

(73) Assignee: Continental Automotive France, Toulouse (FR)

( * ) Notice: Subject to any disclaimer, the term of this patent is extended or adjusted under 35 U.S.C. 154(b) by 260 days.

(21) Appl. No.: 12/065,900

(22) PCT Filed: Sep. 6, 2006

(86) PCT No.: PCT/EP2006/008671

§ 371 (c)(1),
(2), (4) Date: Apr. 2, 2008

(87) PCT Pub. No.: WO2007/028584

PCT Pub. Date: Mar. 15, 2007

(65) Prior Publication Data

US 2008/0236265 A1    Oct. 2, 2008

(30) Foreign Application Priority Data

Sep. 9, 2005    (FR)    ................................. 05 09196

(51) Int. Cl.
*G01M 15/06*    (2006.01)
(52) U.S. Cl. .................................................. 73/114.26
(58) Field of Classification Search .............. 73/114.04, 73/114.26; 123/631

See application file for complete search history.

(56) References Cited

U.S. PATENT DOCUMENTS 5,460,134 A * 10/1995 Ott et al. ..................... 123/476

(Continued)

FOREIGN PATENT DOCUMENTS

DE    199 33 845 A1    1/2001

(Continued)

OTHER PUBLICATIONS

McDonald, "Engine Position Tracking at Shutdown," SAE Tech. Paper Series, No. 2005-01-0048 (Apr. 11, 2005).

*Primary Examiner*—Lisa M Caputo
*Assistant Examiner*—Freddie Kirkland, III
(74) *Attorney, Agent, or Firm*—Young & Thompson

(57) ABSTRACT

Method for determining the reversal of the direction of engine rotation for internal combustion engines having a crankshaft fitted with a target wheel having teeth, one of which is a long tooth, with a unidirectional crankshaft position sensor delivering a signal used for counting teeth and with an engine management device including a processor and a model of the engine behavior in a stalling phase, including: recording the signal and measuring each time difference between two successive edges of the signal, calculating, on the basis of the model, the time variation of the engine position from the time differences between the edges of the signal, and estimating the stopped position of the engine, wherein the model is a second-order polynomial function of time, and the position of reversal of the direction of rotation is estimated from the calculation of the peak position of this second-order polynomial function.

13 Claims, 1 Drawing Sheet

U.S. PATENT DOCUMENTS

| | | | |
|---|---|---|---|
| 5,622,153 A * | 4/1997 | Ott et al. | 123/476 |
| 6,034,525 A * | 3/2000 | Koerner et al. | 324/165 |
| 6,578,550 B1 | 6/2003 | Rupp et al. | |
| 6,691,690 B2 * | 2/2004 | Shin | 123/631 |
| 6,830,015 B2 * | 12/2004 | Venturoli et al. | 123/41 E |
| 7,159,571 B2 * | 1/2007 | Kassner | 123/479 |
| 7,171,925 B2 * | 2/2007 | Beil et al. | 123/41 E |
| 7,185,628 B1 * | 3/2007 | Holm et al. | 123/319 |
| 7,216,030 B2 * | 5/2007 | Kassner | 701/112 |
| 7,370,517 B2 * | 5/2008 | Rupp et al. | 73/114.04 |
| 7,426,877 B2 * | 9/2008 | Ehrlich et al. | 73/862.328 |
| 7,543,564 B2 * | 6/2009 | Holm et al. | 123/406.62 |

FOREIGN PATENT DOCUMENTS

| | | |
|---|---|---|
| DE | 103 24 858 A1 | 1/2004 |
| DE | 102 45 640 B3 | 4/2004 |
| EP | 1 070 964 A2 | 1/2001 |

* cited by examiner

METHOD FOR DETERMINING THE REVERSAL OF DIRECTION OF ROTATION OF AN ENGINE

The present invention is placed, generally speaking, in the field of internal combustion engines for automobile vehicles.

More precisely, the invention relates to the field of engine shutdowns and, in particular, the present invention relates to a method for determining the reversal of the direction of rotation for internal combustion engines equipped with a crankshaft fitted with a target wheel comprising teeth, one of which is a long tooth, with a unidirectional crankshaft position sensor delivering a signal used for counting the teeth, with a tooth counter, and with an engine management device comprising a processor and a model of the engine behaviour in a stalling phase, said method comprising the steps consisting in:
recording the signal coming from the crankshaft position sensor and measuring each time difference between two successive edges of the signal,
calculating, on the basis of the model, the time variation of the engine position from the time differences between the edges of the signal coming from the crankshaft position sensor, and
estimating the stopped position of the engine.

For several years, automobile manufacturers have been thinking about innovative solutions for reducing $CO_2$ emissions from private vehicles. The recently developed system referred to as "Stop and Start" fits directly into this vision.

The "Stop and Start" system is characterized by the shutting down of the engine immediately before and during the immobilization of a vehicle (traffic lights, congestion, etc.). Its restart is automatic and instantaneous upon "release" of the brake pedal when the driver wishes to go for example.

The system therefore consists in making the engine stall when it is not needed and in restarting it as soon as is desired by the driver.

The application of this system requires the starting times of internal combustion engines, which are too long, to be improved.

This starting time may be broken down into two times; a first time for "engine phasing" extending between the first rotation of the starter and the first combustion, and a second time for "establishment of engine speed" that begins at the first ignition and ends when the engine is at stable idle speed.

The engine phasing time cannot be very short and is limited, on the existing systems, by the time required for the processor of the engine management device to calculate the position of the engine.

In order to carry out this function, a device fitted with a sensor/target wheel assembly is commonly used. Typically, the target wheel, mounted onto the crankshaft, comprises 60 teeth spaced out at equal angles, each tooth therefore corresponding to 6 crankshaft degrees, and comprises an angular reference datum called "long tooth" defined by two teeth being eliminated.

At the current time, systems installed for the management of the engine use this long tooth to synchronize themselves. In other words, when starting, the system must wait to see this long tooth before driving the first ignition. Depending on the stopped position of the engine, the time required to reach said long tooth is variable, which is disadvantageous for the engine starting time, making it longer.

In order to reduce the starting time, one solution consists in knowing the stopped position of the engine. This task is difficult to achieve by means of conventional unidirectional crankshaft position sensors because they are not able to determine the direction of rotation of the engine. The problem is that, when it stalls, the engine can change direction of rotation several times and the total count then effected by a unidirectional sensor is completely flawed.

Two major means currently exist for determining this engine stopped position:
the use of a bi-directional sensor, or
the use of a unidirectional sensor combined with a tooth counting process (algorithm).

However, the use of a bi-directional sensor leads to additional manufacturing costs.

The invention is therefore placed in the context of devices using a unidirectional sensor combined with a tooth counting process.

The advantage of such a solution is that it does not require additional components with respect to the conventional devices, since only an algorithm is installed in the application layer of the engine management device.

Such algorithms are known from the prior art, for example from the document SAE 2005-01-0048 "Engine Position Tracking at Shutdown".

In this document, the method is based on the observation of the signal delivered by the sensor placed on the crankshaft. The method calculates an estimated engine speed starting from a second-order extrapolation of the engine speed, compares this estimated speed with the real speed and, if a substantial difference (in other words beyond a threshold value) is observed, the method considers that a reversal of the direction of rotation of the engine has occurred.

The problem associated with such a method is notably linked to the requirement for calibration of a limiting value beyond which a reversal of the direction of rotation of the engine is detected.

Furthermore, it requires numerous mathematical operations which are costly in terms of resources used in the processor of the engine management system.

The present invention aims to overcome these problems by proposing a solution that is simple and easy to implement.

For this purpose, the method according to the invention, and furthermore according to the generic definition presented at the beginning of the description, is characterized in that the model of the behaviour of the engine is a second-order polynomial function of time, and in that the position of reversal of the direction of rotation of the engine is estimated from the calculation of the position of the peak of this second-order polynomial function.

With a solution consisting of a second-order polynomial function, the number of mathematical operations, and the resources required, are limited.

Advantageously, the peak of the second-order polynomial function is estimated starting from at least three successive edges of the signal coming from the crankshaft position sensor.

In the preferred embodiment, the theoretical time of reversal of the direction of rotation of the engine corresponding to the peak of the second-order polynomial function is the time at which the first-order derivative of this function is zero.

The method according to the invention thus comprises a test for reversal of the direction of rotation of the engine in which a function of the time at which the new edge following the last of the edges used in the estimation of the peak of the second-order polynomial function is compared with a function of the theoretical time of reversal of the direction of rotation of the engine.

Thus, when the variable defining the reversal test is negative, the engine management device considers that a reversal of the direction of rotation has occurred and processes the signal coming from the crankshaft position sensor accordingly in order to determine the position of the engine.

In one preferred embodiment, when the variable defining the test for reversal of the direction of rotation of the engine is negative, the tooth counter is split into two counters only one of which counts while considering the reversal to be true, and onto which the processor of the engine management device locks in order to calculate the engine position; the method according to the invention also comprises a validation step in which, if the long tooth is detected to be away from a position expected by the counter onto which the processor is locked, the processor locks onto the other counter.

Preferably, whichever embodiment is used, the calculation of the position of the peak is refreshed at each edge of the signal coming from the crankshaft position sensor.

Furthermore and advantageously, the method according to the invention is implemented when the engine rotation speed falls below a threshold value, notably a value less than or equal to 500 r.p.m.

Other features and advantages of the invention will become clearly apparent from its description presented hereinafter, by way of non-limiting example, with reference to the drawings in which.

A conventional internal combustion engine fitted with an engine management device comprises a tooth counter. This counter is used to represent the position of the engine, in other words the angular position in which the crankshaft is located with respect to a fixed reference. This tooth counter is generally a pulse counter, these pulses being representative of the passage of a tooth of the target wheel integral with the crankshaft in front of the crankshaft position sensor.

When it stalls, an engine changes direction of rotation one or more times, in a more or less random fashion: an engine may, for example, change direction of rotation twice when it stalls and three times when it stalls again.

Moreover, for the same engine, two different stall events do not produce a reversal of the direction of rotation of the engine at the same moment in time.

It is not therefore possible to construct algorithms based on a theoretical sequence of reversals of direction of rotations of the engine.

The method according to the invention allows this constraint to be removed by providing a solution for predicting and even validating the moment of the reversal of the direction of rotation, whenever the reversal occurs.

Figure 1:
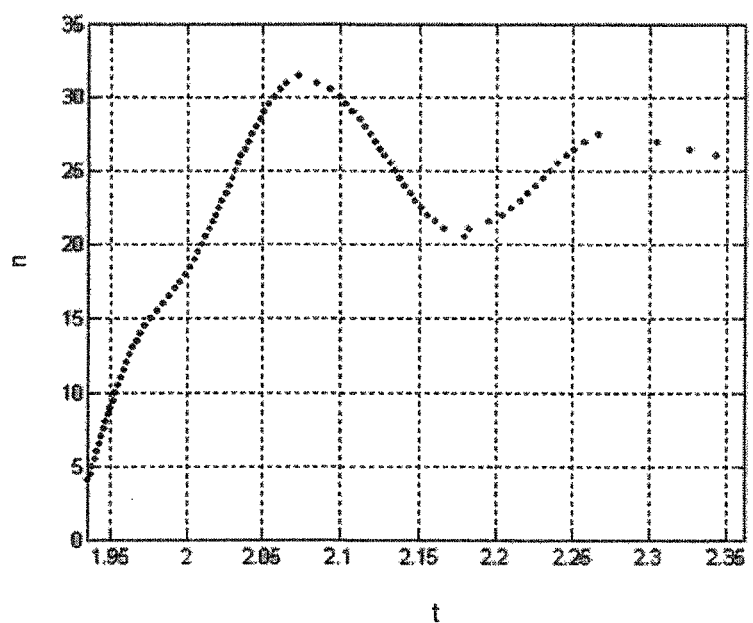
FIG. 1 shows schematically the variation with time of the position of the engine crankshaft during stalling, when a method according to the invention is used.

FIG. 1 shows the value taken by the tooth counter as a function of time during a stalling phase of the engine, if it really takes into account the reversals of direction of rotation of said engine. The values on the abscissa, given by way of illustration, are expressed in seconds. On the ordinate axis, the number of the teeth on the target wheel integral with the crankshaft is plotted, said teeth being numbered arbitrarily starting from the reference long tooth.

Up to t=2.05 s, the engine rotates in the positive sense, and the tooth counter is incremented as the edges of the signal coming from the crankshaft sensor pass by.

Between t=2.05 s and t=2.1 s, the engine goes through a point of zero speed and changes direction of rotation at around tooth number 32. The tooth counter then subsequently counts down.

A new change in direction of rotation takes place between t=2.15 s and t=2.2 s at around tooth number 20; and yet another one between t=2.25 s and t=2.3 at around tooth number 28.

During the whole engine stall phase shown in this FIG. 1, the engine therefore changes direction of rotation three times and stops on tooth number 26.

In the absence of a method for determining the change in direction of rotation, the tooth counter would only be incremented in a unidirectional manner, and the stopped position of the engine considered by the tooth counter would not be tooth number 26, but more probably tooth number 54 (value obtained by addition in absolute value of the number of teeth counted between each reversal), which is almost a half-turn of the engine with respect to the true position.

The problem is therefore to determine the moments in time at which the engine changes direction of rotation, in other words the points of inflection of the curve shown in FIG. 1.

For this purpose, the present invention uses mathematical modelling of the engine behaviour in the neighbourhood of the reversals of direction of rotation of the engine.

This mathematical modelling is installed in the applications layer of the engine management device, also referred to as ECU (Electronic Control Unit).

The installed model must be optimized in order to represent sufficiently correctly the true behaviour of the engine, without however adversely affecting the processing resources by overloading the ECU with operations.

With this in mind, the installed model consists in representing the engine behaviour in the neighbourhood of a reversal of the direction of rotation of the engine by a second-order polynomial function (in other words, a parabola).

For this purpose, the engine position y is defined as a function of time t as follows:

$$y = a \cdot t^2 + b \cdot t + c$$

where a, b and c are three real numbers.

Figure 2:
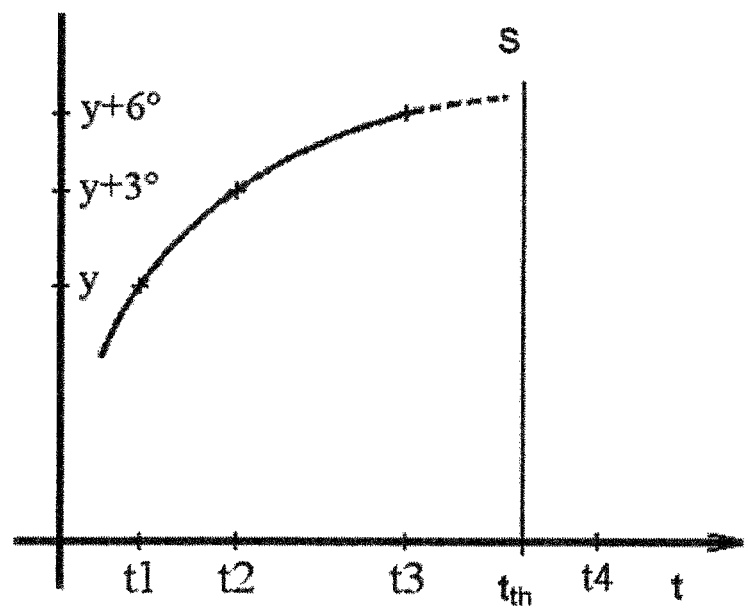
FIG. 2 shows the mathematical model on which the invention is based.

This mathematical approximation is shown in FIG. 2.

FIG. 2 is a curve whose abscissa axis corresponds to time t and ordinate axis corresponds to the position of the engine. With a target wheel integral with the crankshaft comprising 60 teeth, each tooth represents a 6° rotation of the crankshaft. It is considered therefore that each edge detected (one for the start of the tooth, another for the end) represents 3° of crankshaft rotation. Thus, the passage of the start of a tooth d in front of the crankshaft sensor generates an edge (rising in this case) y at a time t1. The passage of the end of the tooth d generates an edge (falling in this case) y+3° at a time t2. Then, the passage of the start of the next tooth d+1 generates an edge (rising in this case) y+6° at a time t3.

It is clear that this reasoning is just as applicable if the edge y represents the passage of the end of the tooth d. In which case, the edge y+3° represents the start of the tooth d+1, etc.

The points (t1, y), (t2, y+3°), (t3, y+6°) are used to calculate the abscissa of the peak of the parabola going through these three points.

The three real numbers (a, b, c) may therefore be defined such that:

$$\begin{cases} y = a \cdot t_1^2 + b \cdot t_1 + c \\ y + 3 = a \cdot t_2^2 + b \cdot t_2 + c \\ y + 6 = a \cdot t_3^2 + b \cdot t_3 + c \end{cases}$$

This system is equivalent to:

$$\begin{cases} y = a \cdot t_1^2 + b \cdot t_1 + c \\ 3 = a \cdot (t_2^2 - t_1^2) + b \cdot (t_2 - t_1) \\ 3 = a \cdot (t_3^2 - t_2^2) + b \cdot (t_3 - t_2) \end{cases}$$

From the two last equations, the equation linking a and b is extracted:

$$a \cdot (t_2^2 - 2t_2^2 + t_1^2) = -b \cdot (t_3 - 2t_2 + t_1)$$

By calculating the first-order derivative, the point of inflection of the second-order polynomial curve can be calculated, for which the derivative is zero.

In this way, the engine management system calculates the theoretical time $t_{th}$ corresponding to the point of inflection S of the curve, and therefore the corresponding engine position (namely, in FIG. 2, between y+6° and y+9°).

The next edge arrives at time t4. To this time t4 corresponds:
either the end of the tooth d+1 generating an edge y+9°, if there is no reversal of the direction of rotation of the engine,
or the start once again of the tooth d+1 generating an edge y+6°, if there is reversal.

Thus, when the edge arrives at time t4, the positive or negative value of the difference between this time t4 and the theoretical reversal time $t_{th}$ determines whether the engine has or has not changed direction of rotation.

The variable A of the test to be carried out for determining a reversal can therefore be defined. Since the calculation is done at time t4, the value of t4 is to be compared with the value of the time corresponding to the time for which the first-order derivative of the second-order polynomial function is zero, in other words:

$$A = \frac{-b}{2a} - t_4 = \frac{t_3^2 - 2t_2^2 + t_1^2}{2(t_3 - 2t_2 + t_1)} - t_4$$

If A is positive, the peak of the parabola is estimated to be after the current edge t4: there is no reversal of the direction of rotation of the engine.

If A is negative, the peak of the parabola is estimated to be before the current edge t4: there is a reversal.

However, the aforementioned calculations must be done with absolute time, which poses difficulties in implementation. In consequence, preferably, the invention defines a relative time consisting in measuring the time differences between the events (passing of the teeth in front of the sensor generating rising and falling edges of the crankshaft signal).

Typically, for this purpose, timers are used which are updated preferably at each edge.

In the model, the following change of variables is therefore applied, with $t_1$, $t_2$, $t_3$ and $t_4$ the successive times at which four successive edges of the signal coming from the crankshaft position sensor respectively arrive:

$$\begin{cases} T_2 = t_2 - t_1 \\ T_3 = t_3 - t_2 \\ T_4 = t_4 - t_3 \end{cases}$$

Moreover, in order to simplify the calculations, it may be assumed that $t_1$ is equal to 0. The test variable A then becomes:

$$A = \frac{(T_3 + T_2)^2 - 2(T_2)^2}{2(T_3 + T_2 - 2(T_2))} - (T_4 + T_3 + T_2)$$

$$A = \frac{T_3^2 - T_2^2 + 2T_3 T_2}{2(T_3 - T_2)} - (T_4 + T_3 + T_2)$$

finally yielding:

$$A = \frac{T_3 T_2}{T_3 - T_2} - \frac{T_3 + T_2}{2} - T_4$$

In the test for reversal of the direction of rotation of the engine according to the invention, $t_i$ is therefore the time at which an edge of the signal coming from the crankshaft position sensor arrives and $t_{i+1}$ the time at which the next edge of the signal coming from the crankshaft position sensor arrives; $T_i$ is the time difference between two successive edges of the signal, and $T_{i+1}$ the time difference between two successive edges of the signal where the first edge is the last one of the edges with the time difference $T_i$.

This test is preferably implemented at each edge of the signal coming from the crankshaft position sensor. In this case, the time difference T2 measured for an edge f becomes the difference T1 for the next edge f+1, the difference T3 becomes the difference T2, etc.

The measurements of time differences T1, T2, T3, etc. are stored in a memory of the engine management device.

The time t4 that the corresponding edge takes to generate a signal, or, more exactly, the time difference T4 between this edge and the preceding one, is used to estimate whether the reversal has occurred by solving the variable A of the aforementioned test.

As seen with the previous calculations, the method for estimating the engine reversal according to the invention is based on a calculation in which the peak S of the second-order polynomial function is estimated starting from three successive edges. The peak S of the function, in this case a parabola, could equally be determined by a calculation using more edges, but this would be in danger of substantially lengthening the processing times. Accordingly, preferably, the estimation is carried out using three successive edges and the calculation is carried out upon the following edge, which is the fourth.

The estimation for reversal of the direction of rotation of the engine is therefore performed upon the arrival of the edge following the last of the edges used for the estimation of the position of reversal.

A function of the time of arrival of the new edge following the last of the edges used for the estimation of the peak of the second-order mathematical function is compared with a function of the theoretical engine reversal time. Thus, preferably, the true time difference corresponding to the time difference between the new edge following the last of the edges used for the estimation of the peak S of the polynomial function and the last of the edges used for the estimation of the peak S of the polynomial function is compared with the theoretical difference corresponding to the difference between the estimated time corresponding to the peak S of the second-order polynomial function and the last of the edges used for the estimation of the position of reversal of the direction of rotation of the engine.

The calculation of the reversal estimation is, preferably, performed in a "moving" fashion, i.e. the calculation of the position of the peak is refreshed at each edge of the signal coming from the crankshaft position sensor.

Advantageously, the method according to the invention additionally comprises a validation step in which, when the reversal test is positive, the tooth counter is split into two counters only one of which counts by considering the reversal of the direction of rotation of the engine as being true, and onto which the processor of the engine management device locks in order to calculate the engine position, and the other which counts by considering the reversal of the direction of rotation of the engine as being false. If the long tooth is detected to be away from a expected position by the counter onto which the processor is locked, the processor then locks onto the other counter.

The method according to the invention is only advantageously implemented below a threshold value of engine speed, notably a value less than or equal to 500 r.p.m.

The invention claimed is:

1. A method for determining the reversal of the direction of engine rotation for internal combustion engines equipped with a crankshaft fitted with a target wheel comprising teeth, one of which is a long tooth, with a unidirectional crankshaft position sensor delivering a signal used for counting the teeth, with a tooth counter, and with an engine management device comprising a processor and a model of the engine behaviour in a stalling phase, the method comprising the steps consisting in:
  recording the signal coming from the crankshaft position sensor and measuring each time difference between two successive edges of the signal,
  calculating, on the basis of the model, the time variation of the engine position from the time differences between the edges of the signal coming from the crankshaft position sensor, and
  estimating the stopped position of the engine,
characterized in that the model of the engine behaviour is a second-order polynomial function of time t, and in that the position of reversal of the direction of rotation of the engine is estimated from the calculation of the position of the peak S of this second-order polynomial function of the type:

$$y = a \cdot t^2 + b \cdot t + c$$

where a, b and c are three real numbers.

2. The method as claimed in claim 1, in which the peak S of the second-order polynomial function is estimated starting from at least three successive edges of the signal coming from the crankshaft position sensor.

3. The method as claimed in claim 2, in which the theoretical time of reversal of the direction of rotation of the engine corresponding to the peak S of the second-order polynomial function is the time for which the first-order derivative of this function is zero.

4. The method as claimed in claim 2, in which the calculation of the position of the peak S is refreshed at each edge of the signal coming from the crankshaft position sensor.

5. The method as claimed in claim 2, characterized in that it is implemented when the engine rotation speed falls below a threshold value, notably a value less than or equal to 500 r.p.m.

6. The method as claimed in claim 1, in which the theoretical time of reversal of the direction of rotation of the engine corresponding to the peak S of the second-order polynomial function is the time for which the first-order derivative of this function is zero.

7. The method as claimed in claim 6, comprising a test for reversal of the direction of rotation of the engine in which a function of the time at which the new edge following the last of the edges used for the estimation of the peak S of the second-order polynomial function is compared with a function of the theoretical time of reversal of the direction of rotation of the engine.

8. The method as claimed in claim 7, in which the test for reversal of the direction of rotation of the engine is defined by the following variable A:

$$A = \frac{T_2 T_3}{T_3 - T_2} - \frac{T_3 + T_2}{2} - T_4$$

where $$\begin{cases} T_2 = t_2 - t_1 \\ T_3 = t_3 - t_2 \\ T_4 = t_4 - t_3 \end{cases}$$

with $t_1$, $t_2$, $t_2$ and $t_4$ the successive times at which the four successive edges of the signal coming from the crankshaft position sensor respectively arrive.

9. The method as claimed in claim 8, in which, when the variable A of the reversal test is negative, the engine management device considers that a reversal of the direction of rotation has occurred and processes the signal coming from the crankshaft position sensor accordingly in order to determine the position of the engine.

10. The method as claimed in claim 9, in which, when the variable A of the test for reversal of the direction of rotation of the engine is negative, the tooth counter is split into two counters only one of which counts by considering the reversal to be true, and onto which the processor of the engine management device locks in order to calculate the engine position,
  the method also comprising a validation step in which, if the long tooth is detected to be away from an expected position by the counter onto which the processor is locked, the processor locks onto the other counter.

11. The method as claimed in claim 8, in which, when the variable A of the test for reversal of the direction of rotation of the engine is negative, the tooth counter is split into two counters only one of which counts by considering the reversal to be true, and onto which the processor of the engine management device locks in order to calculate the engine position,
  the method also comprising a validation step in which, if the long tooth is detected to be away from an expected position by the counter onto which the processor is locked, the processor locks onto the other counter.

12. The method as claimed in claim 1, in which the calculation of the position of the peak S is refreshed at each edge of the signal coming from the crankshaft position sensor.

13. The method as claimed in claim 1, characterized in that it is implemented when the engine rotation speed falls below a threshold value, notably a value less than or equal to 500 r.p.m.

* * * * *